July 26, 1938.   A. O. GROOMS   2,125,070
REFRIGERATING APPARATUS
Filed Aug. 30, 1934   6 Sheets—Sheet 3

Inventor
Albert O Grooms
By Spencer Hardman and Fehr
Attorneys

July 26, 1938.　　　A. O. GROOMS　　　2,125,070
REFRIGERATING APPARATUS
Filed Aug. 30, 1934　　　6 Sheets-Sheet 4

Inventor
Albert O Grooms
By Spencer Hardman and Fehr
Attorneys

July 26, 1938.　　　　　　A. O. GROOMS　　　　　2,125,070
REFRIGERATING APPARATUS
Filed Aug. 30, 1934　　　　　6 Sheets-Sheet 6

Fig. 12

No. 1 COLD CONTROL POSITION

Fig. 13

INVENTOR.
Albert O Grooms
BY
Spencer Hardman and Fehr
ATTORNEYS

Patented July 26, 1938

2,125,070

UNITED STATES PATENT OFFICE 2,125,070

REFRIGERATING APPARATUS

Albert O. Grooms, Dayton, Ohio, assignor to General Motors Corporation, Dayton, Ohio, a corporation of Delaware Application August 30, 1934, Serial No. 742,125

14 Claims. (Cl. 62—4)

This invention relates to refrigerating apparatus and more particularly to control means therefor.

Heretofore, it has been proposed to provide the control means of a refrigerating system with a plurality of selective control features, such as a quick freezing cycle control, a defrosting cycle control, temperature regulation and periodic defrosting. With so many selective features available for the user, it is quite often that one or more of the features are not returned to the normal or ineffective position before selecting and manipulating another of the control features. Under such conditions, the feature selected would usually fail to operate or be delayed in its operation, often causing considerable trouble and unpleasantness to the user.

It is an object of my invention to provide a refrigerating system with a control means having a plurality of convenient selective features providing different forms of operation, any one of which is effective to overcome the setting of the other to immediately give effect to the last selected setting.

It is another object of my invention to provide a refrigerating system with a control means capable of providing continuous cyclical operation of the system at different selected average temperatures, as well as to provide for a single cycle of operation at a lower temperature for quick freezing and an optional single cycle of operation at a higher temperature for defrosting, and for periodic higher temperature cycling for periodic defrosting of the evaporator.

It is a further object of my invention to provide a means within the system for adequately protecting the refrigerating apparatus to prevent its operation under conditions capable of damaging the apparatus.

Further objects and advantages of the present invention will be apparent from the following description, reference being had to the accompanying drawings, wherein a preferred form of the present invention is clearly shown.

Figure 1:
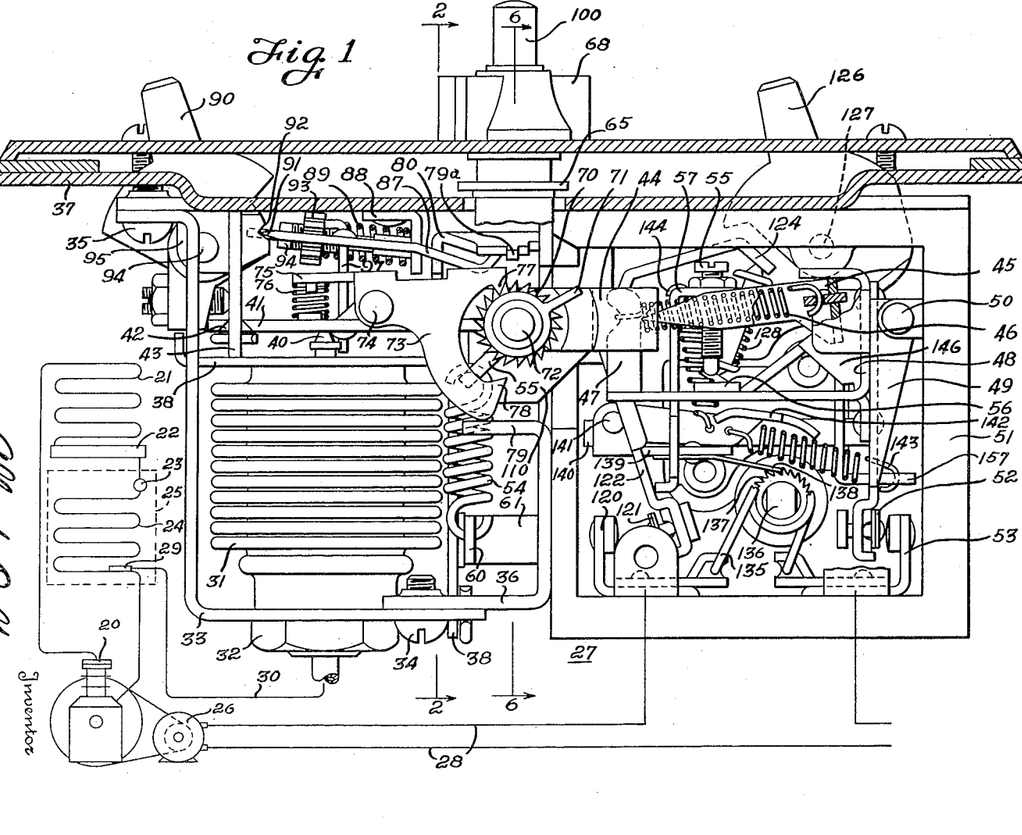
Fig. 1 is a view of the refrigerating system partially diagrammatic, including my improved control means.

Referring to the drawings and more particularly to Fig. 1, there is shown a refrigerating system including a compressor 20 for compressing refrigerant and for forwarding the compressed refrigerant to a condenser 21 where the compressed refrigerant is liquefied and collected in a receiver 22. From the receiver 22, the liquid refrigerant is forwarded under the control of a suitable control means 23 such as an expansion valve or restrictor to an evaporator 24 located within an insulated compartment 25 to be cooled. The compressor 20 which withdraws the evaporated refrigerant from the evaporator and pumps it into the condenser is driven by an electric motor 26 under the control of a control means 27 located in series with the electric motor 26 in the electric motor circuit 28. The control means 27 is controlled according to the temperature of the evaporating means through a thermostatic bulb 29 which is charged with fluid refrigerant and connected by a conduit 30 with the control means.

The conduit 30 connects with a metal bellows 31 which is fastened at its lower end by the nut 32 to an L-shaped bracket 33 which in turn is fastened by the screws 34 and 35 to the depending portion 36 and the transverse plate portion 37 of the metal framework of the control means. The expansion of the metal bellows is limited by an inverted L-shaped metal member 38 which passes through apertures in the L-shaped bracket 33 to hold it in position. The upper or free end of the metal bellows 31 is provided with a pointed projection 40 which passes through an aperture in the inverted L-shaped stop member 38 and engages a recess in the primary lever 41. This primary lever 41 is provided with notches 42 which engage and form a pivotal connection with a depending metal plate portion 43 of the metal framework. The free end of the primary lever 41 is provided with an insulating portion 44 provided with an enclosed pair of notches which receive the pointed end of the secondary lever 45, which in turn is connected by the toggle spring 46 with the anchor post 47 of a bell crank lever. This bell crank lever is formed of one portion 48 which carries the anchor post 47 and also provides stopping means for the secondary lever 45 and which is riveted to the contact carrying portion 49 pivoted by a pivot pin 50 to the adjacent wall of the insulated box shaped enclosure 51. This contact carrying portion carries through the medium of a universal connection a contact bar 52 which is adapted to bridge a pair of switch contacts 53 which are situated one behind the other in Fig. 1.

When the temperature of the evaporating means 24 is high, the volatile liquid within the thermostatic bulb 29 vaporizes, causing the pressure within the bellows 31 to increase and move the primary lever 41 in a counter-clockwise direction on its pivot point, thereby moving the pivotal connection between the primary and secondary lever upwardly across the dead center line of the toggle spring 46, so that the toggle spring will pull the free end of the secondary lever 45 downwardly against the horizontal portion of the bell crank contact carrying lever, thereby causing the bell crank contact carrying lever to be moved in a counter-clockwise direction about the pivot pin 50 to cause the contact bar 52 to engage and bridge the contacts 53 to close the electric motor circuit 28. This will cause the operation of the electric motor 26 and the refrigerating system which will reduce the temperature of the evaporating means and the thermostatic bulb 29 so that the volatile liquid will condense within the thermostatic bulb 29 and reduce the pressure within the bellows 31.

The reduction of pressure within the bellows 31 will permit the primary lever 41 to be moved in a clockwise direction about its pivot point under the influence of the tension coil spring 54 which is connected to a downwardly turned ear 55 formed of a part of the primary lever 41. This clockwise movement of the primary lever 41 will move the pivotal connection between the primary lever 41 and the secondary lever 45 downwardly so as to cause the free end of the secondary lever 45 to snap upwardly against the stop portion of the member 48 of the contact carrying bell crank lever so as to cause the bell crank lever to turn in a clockwise direction about its pivot pin 50 until it engages the differential adjusting screw 55 which engages the projecting portion 56 on the bell crank lever. This differential screw 55 is threaded through a guide plate 57 and is provided with a locking nut for holding it in position. The differential screw 55 by determining the open contact position of the bell crank lever determines the difference in the bellows pressure between contact opening position and contact closing position.

For a fixed tension of the control spring 54 and a fixed setting of the differential screw 55, the contacts 52 and 53 are opened and closed according to predetermined temperatures of the evaporator 24, such as 5° and 25°, which is a common setting in ordinary household refrigerators.

Figure 2:
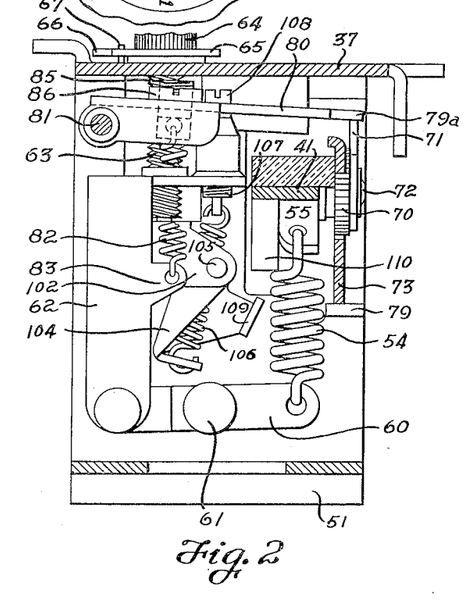
Fig. 2 is a sectional view taken along the line 2—2 of Fig. 1, showing a portion of the temperature regulating mechanism with the selective temperature regulator in the closed position.
Figure 3:
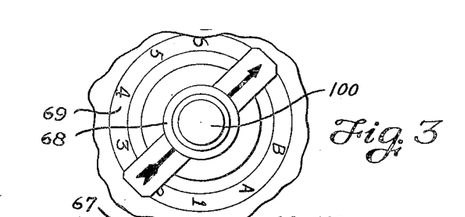
Fig. 3 is a plan view of a temperature regulating knob in the position corresponding to the setting shown in Fig. 2.

Referring now more particularly to Fig. 2, the lower end of the control spring 54 is connected to a lever 60 pivoted at its midpoint to a pin 61 and connected at its opposite end to a slide or carriage 62 threaded upon the temperature regulating screw 63 which is rotatably mounted in the transverse frame portion 37 of the control means. This temperature regulating screw 63 is provided with a splined head 64 which receives a collar 65 having a serrated aperture and a projection 66 adapted to cooperate with a pin 67 to limit the free rotation of the screw 63 to a single turn so as to limit the temperature adjustment of the control means. The splined head 64 also receives a temperature regulating knob 68 provided with an indicating arrow which cooperates with the indicating dial 69 to indicate the various positions of temperature regulation designated B, A, and 1 to 7 inclusive. The temperature regulating knob 68 serves as a means for providing a limited temperature regulation for the user. If further temperature regulation is desired, it is necessary to remove the temperature regulating knob 68 and the collar 65, then turn the temperature regulating screw 63 the desired amount and replace the collar 65 and the temperature regulating knob 68 in the same relative position with respect to the pin 67 and the dial 69, in order to provide a new range of temperature regulation for the user. If desired, this temperature range may extend above the freezing point, so as to cause frost to melt from the evaporator when the temperature regulating knob is set in its warmest, or B position. However, I prefer to have the temperature regulating range extend entirely below freezing temperatures.

This, however, causes frost to continuously accumulate on the evaporator and I have, therefore, provided automatic means of an improved type for removing this frost. This frost acts as an insulator, and therefore, prevents the efficient cooling of the enclosure by the evaporator 24. In order to keep this amount of frost at a minimum, I have provided means for periodically varying the operation of the control means so as to cause a temperature above freezing to be attained in the evaporator 24 so that the frost will melt therefrom.

This is performed by a ratchet wheel 70 which has fixed thereto a member with a projection 71. This ratchet wheel 70 and the member 71 are rotatably mounted upon a pin 72 which is anchored in the insulating end portion 44 of the primary lever 41. The ratchet wheel 70 and the projecting portion or pin 71 are rotated by an anchor type of member 73 which is pivoted upon a pin 74 extending from the primary lever 41. This anchor member 73 has a tail portion 75 and a small compression type coil spring 76 extends between this tail portion 75 and the primary lever 41 so as to urge the anchor member 73 in a clockwise direction about the pivot pin 74. The anchor member 73 has a tooth 77 at its upper end adapted to engage the ratchet wheel 70 and another tooth 78 also adapted to engage the ratchet wheel. The portion of the anchor member which carries the tooth 78 is adapted to engage a platform 79 formed on the depending portion 36 of the control frame. When the bellows 31 contracts, the primary lever 41 moves in a clockwise direction carrying the ratchet wheel 70 and the anchor member downwardly. As the primary lever 41 approaches switch opening position, the lower portion of the anchor member 73 which carries the tooth 78 comes to rest upon the platform 79. Further downward movement of the primary lever 41 causes the switch contacts to be opened and causes the tooth 78 to be moved toward the ratchet wheel. This mechanism is similar to the common escapement mechanism of a timepiece but operates somewhat differently.

After the switch contacts close, the primary lever 41 continues to move under the influence of the tripped toggle spring 46 and during this movement, the tooth 78 engages the inclined side of one of the teeth of the ratchet wheel 70 just beyond the tip thereof so that further downward movement by the coaction of the tooth 78 on the anchor member 73 with the inclined face of the tooth on the ratchet wheel will move the ratchet wheel in a clockwise direction through an angular distance corresponding to something less than the arc of a single tooth. By rotating the ratchet wheel on the overtravel of the primary lever 41 after the switch contacts have been opened, the cut-off point of the switch is not affected by the ratcheting. The opening of the control contacts causes the stopping of the refrigerating system, thus permitting the temperature of the evaporator to rise and thereby causing the pressure to increase within the bellows 31.

This will cause the primary lever 41 to begin a counter-clockwise movement, during which time the anchor member 73 will slowly rotate in a clockwise direction about its pivot pin 74 under the influence of the coil spring 76 which maintains the portion of the anchor member 73 in contact with the platform 79. During the middle portion of this movement, the upper tooth 77 of the anchor member comes into engagement with the inclined face of one of the ratchet teeth near its mid-point and upon further movement of the primary lever 41, rotates the ratchet wheel through the angular distance corresponding to half a tooth until it engages the bottom of the depression between the teeth. In this way, the ratchet wheel is rotated a predetermined accurate amount for each cycle of the refrigerating system.

When the projection or point 71 is rotated to its upper vertical position, it engages the projection 79a which resiliently opposes the upward movement of the primary lever 41. Through this means, there is imposed once every revolution of the ratchet wheel an additional resilient resistance to the expansion of the bellows 31 so that an increased pressure within the bellows corresponding to a temperature of the evaporator 24 above 32° F. is required before the bellows and the primary lever 41 may move a sufficient distance so as to cause the control contacts to be closed to again start the refrigerating system. By increasing the temperature of the evaporating means above 32° F., the frost begins to melt from the evaporator. After sufficient pressure is attained to close the contact under such conditions, the ratchet wheel moves downwardly and again comes into engagement with the tooth 78, so that the projecting portion of pin 71 is moved from its vertical position so that it will not again engage the resilient projection 79a until the succeeding revolution of the ratchet wheel. During a normal cycle, the projection or point 71 is at some other position so that it does not engage the projection 79a and no additional resistance is provided resisting the movement of the primary lever to switch closing position.

Figure 4:
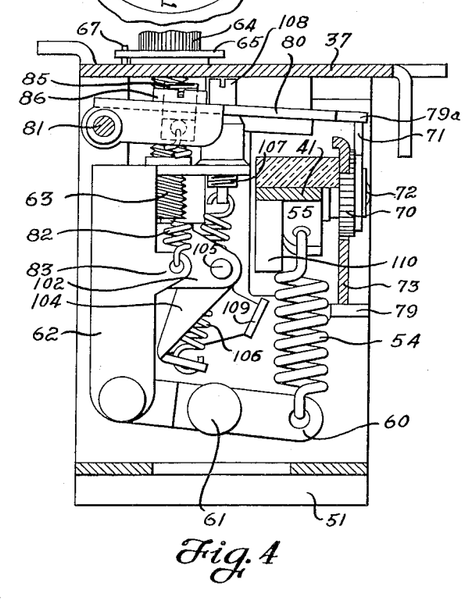
Fig. 4 is a sectional view taken along the line 2—2 of Fig. 1, showing the temperature regulating mechanism set for the warmest temperature provided by the temperature selector.
Figure 5:
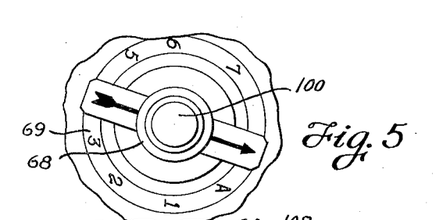
Fig. 5 is a plan view showing the temperature selecting knob in the position corresponding to the setting shown in Fig. 4.

The resilient projection 79a is a tooth or projection formed on the end of a transverse lever 80 (see Figs. 2 and 4) which is pivoted upon a pin 81 fixed to the control frame and which is resiliently urged in a clockwise direction about its pivot pin 81 by a tension coil spring 82 which is connected to an ear 83 formed on the carriage 62 of the temperature regulating mechanism. Thus, when the temperature regulating carriage is moved downwardly, corresponding to a movement of the temperature regulating knob to a lower temperature position, the spring 82 is stretched and thereby the tension upon the spring 82 is increased. Inasmuch as a lesser resistance to the expansion of the bellows is provided in the lower temperature position, this increase in tension of the spring 82 will compensate for the lower temperature regulating position so that the temperature secured by the defrosting cycle remains substantially the same.

The defrosting spring 82 is provided with an adjustment by being connected at its upper end to a threaded member 85 which carries an adjusting nut 86 resting upon the upper side of the lever 80. The position of the lever 80 is controlled by an arm 87 which is pivoted upon the bracket 88 extending from the control frame and which in cooperation with the compression spring 89 and the finger manipulator 90 forms a toggle mechanism. The arm 87 is provided with a chisel shaped end 91 which is held in a notch 92 formed in the finger manipulator by the compression spring 89 which extends between the bracket 88 and an adjusting nut 93 which is threaded upon a threaded pin 94 extending from an aperture in the bracket 88 to the yoke portion of the arm 87 and serving as a guide for the spring 89.

By this toggle device, the arm 87 as well as the finger manipulator 90 are held in either one of two positions. In the position shown in Fig. 1, the finger manipulator 90, which is pivoted upon the pin 94 to a pair of ears 95 extending from the member 43, is shown in its extreme counter-clockwise position, while the arm 87 is shown in its extreme clockwise position. When the finger manipulator 90 is moved in a clockwise direction across the dead center line of the toggle mechanism, the arm 87 under the force of the toggle spring 89 moves to its extreme counterclockwise direction and lifts up the projection 79a and the lever 80 so that the projection 79a is up out of the path of the projecting portion of the pin 71 connected to the ratchet wheel 70. This, therefore, prevents the occurrence of the periodic defrosting cycle.

In order to provide means for obtaining a single defrosting cycle independently of the periodic defrosting cycle, I provide a link 97 which extends between the arm 87 and the primary lever 41, so that when the finger manipulator 90 is in its extreme clockwise position, an additional resistance is provided which opposes the expansion of the bellows 31, thereby increasing the pressure required therein before the contact bar 52 may be moved to a closed circuit position. The link 97 is formed of heavy sheet metal or metal plate and has shoulders resting upon the arm 87 and the primary lever 41 together with projections extending therethrough. When the bellows 31 has expanded a sufficient amount, the primary lever 41 through the link 97 will move the toggle mechanism upwardly across the dead center position, so that the finger manipulator 90 and the arm 87 will move under the force of the toggle mechanism to their extreme counter-clockwise and clockwise positions respectively, whereby the link 97 is pulled upwardly such a distance that it will not be engaged by the primary lever. In order to discontinue such a defrosting cycle, the finger manipulator may be moved manually at any time to this position.

If desired, however, either one of these defrosting features may be omitted, so that one of the positions of the finger manipulator 90 may be used to prevent any defrosting. Thus, if it is desired to provide a control means without a periodic defrosting device, the ratchet wheel, together with the projecting pin, the transverse lever and its spring may be omitted from the device, leaving the arm 87, the toggle mechanism and the link 97 as a single cycle defrosting device. On the other hand, if it is desired to omit the single cycle defrosting device, then the link 97 is omitted but the ratchet wheel together with the projecting pin, the transverse lever and its spring are retained for periodic defrosting. When one of these devices is omitted, the former operating position of the finger manipulator for the device omitted becomes the position for shutting off the defrosting device retained.

Figure 6:
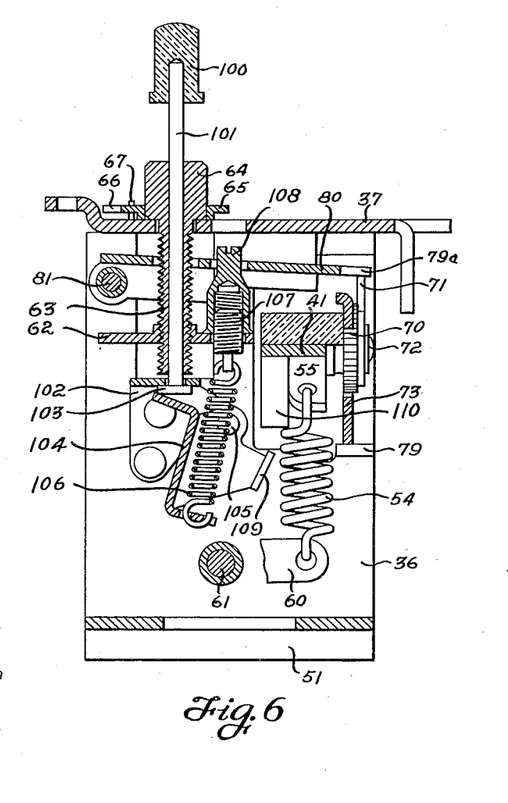
Fig. 6 is a view taken along the line 6—6 of Fig. 1 with the quick freezing mechanism in ineffective position.
Figure 7:
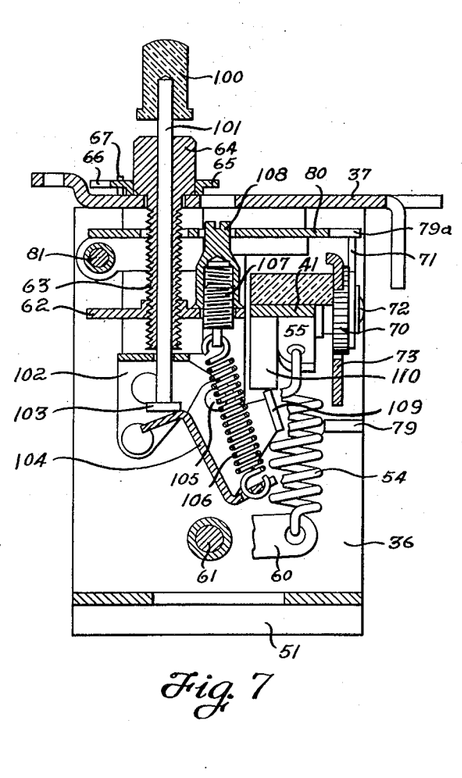
Fig. 7 is a sectional view on the line 6—6 of Fig. 1 with the quick freezing mechanism in effective position.

As better shown in Figs. 6 and 7, I have also provided a quick freezing device which provides a single low temperature cycle. To operate this device, I have provided a button 100 located within and movable within the center of the temperature regulating knob 66. This knob is fastened to the upper end of a rod 101 which extends down through the center of the temperature regulating screw 63. This rod also passes through a bracket 102 which is riveted to the depending portion 36 of the switch frame. The lower end of the rod 101 is provided with a head 103 which is adapted to engage one end portion of a toggle member 104 which is pivoted upon the pin 105 carried by the bracket 102. The toggle member 104 is connected by a tension coil spring 106 with a threaded member 107 carrying an adjusting nut 108 which rests upon the carriage 62 of the temperature regulating mechanism. The toggle member 104 has a foot 109 formed thereon which engages, when moved into the position shown in Fig. 7, a molded depending portion 110 formed on the primary lever 41. This toggle member 104 is moved into this position by pushing downwardly upon the button 100 which through the rod moves toggle member 104 together with its spring 106 across its dead center position, so that the foot resiliently engages the under side of the depending portion 110. In this way, a resilient obstruction or resistance is placed in the path of the downward movement of the primary lever 41 which then requires a much lower pressure within the bellows 31 corresponding to a much lower temperature of the evaporating means 24 before the contact bar 52 may be moved to open circuit position.

When a sufficiently low temperature is obtained, the primary lever 41 moves downwardly and the depending portion 110 by its engagement with the foot 109 moves the toggle member 104 and the toggle spring 106 in a clockwise direction across the dead center position to its ineffective position shown in Fig. 6. The temperature attained by this quick freezing cycle is maintained substantially constant regardless of the setting of the temperature regulating screw 63, since the position of the temperature regulating screw and temperature adjustment is compensated because the upper end of the toggle spring 106 is anchored through the threaded member 107 and the adjusting nut 108 to the carriage 62 of the temperature regulating mechanism and the downward movement of the carriage to a colder position setting contracts and weakens this toggle spring 106. Thus, through separate springs connected to this carriage, both the defrosting mechanism and the quick freezing mechanism are compensated so that the temperatures attained by these mechanisms are not substantially affected by the setting of the temperature regulating knob 66.

Figure 8:
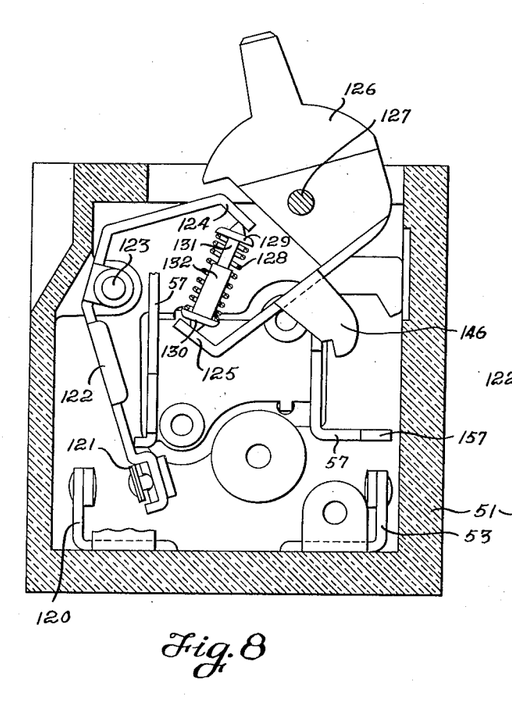
Fig. 8 is a vertical sectional view showing the manual "on" and "off" control with the contacts in open position.
Figure 9:
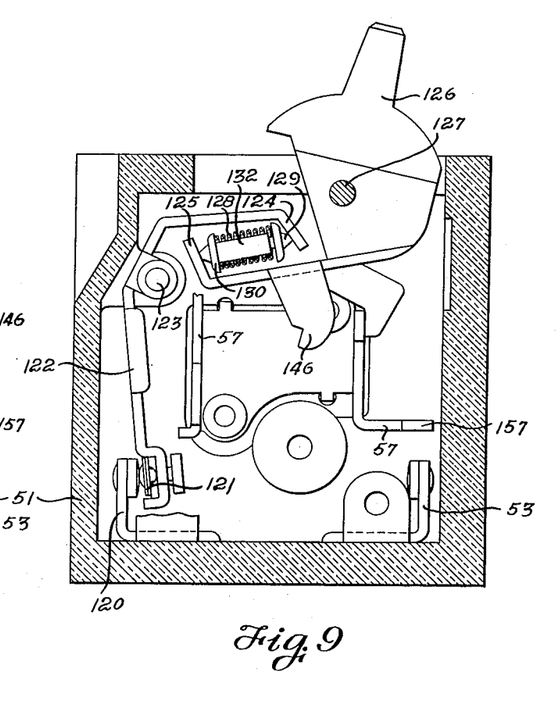
Fig. 9 is a vertical sectional view of the manual "on" and "off" control with the contacts in closed position.

In my control mechanism, I have also provided a convenient means whereby the refrigerating system may be turned on and shut off. In order to do this without disturbing or imposing any added strain upon the parts operated by the bellows 31, I have provided a separate set of contacts 120 located within the insulated enclosure 51 directly opposite the contacts 53 and located one behind the other in a somewhat similar manner. These contacts are adapted to be bridged by a contact bar 121 which is connected by a universal connection to a contact lever 122 which at its mid-point is pivoted upon the pin 123 fixed to the insulated enclosure. The opposite end of the lever 124 is connected by a toggle spring to a foot 125 forming part of a finger manipulator 126 pivoted upon the pin 127 fixed within the insulated enclosure 51. The connection between the end portion 124 and the foot 125 is provided by a small compression spring 128 which at its opposite ends engages the conically pointed spring retainers 129 and 130 which are retained in suitably formed recesses in the end portions 124 and 125. The spring retainer 129 has a rod 131 extending therefrom which extends into a tubular portion 132 extending from the spring retainer 130, so as to form a guide for the spring 128. Through this mechanism, when the finger manipulator 126 is moved toward the left in counter-clockwise direction about its pivot pin, the contact bar 121 is moved to open circuit position with a snap action, whereas when the finger manipulator is moved to the right in a clockwise direction about its pivot point, the contact bar 121 is moved to closed circuit position with a snap action.

In connection with this toggle circuit controlling mechanism I have provided a thermal overload mechanism which will positively prevent the operation of the refrigerating system under overload conditions. In order to do this, I take advantage of the excessive flow of current through the electric motor circuit under overload conditions. For this purpose, I have provided a nickel chromium heater wire 135 located in series with and connecting the contacts 53 and 120. This heater wire is coiled about a brass pin 136 fixed to the rear wall of the insulated enclosure 51 and provided with a ratchet wheel 137 fixed thereto by a suitable fusible binder such as a suitable solder which will melt or become fusible when an overload current passes through the electric circuit and generates heat within the coil of the heater wire 135. This ratchet wheel is normally engaged by a latch formed of a leaf spring 138 which is riveted to a slide bar 139. This slide bar is slidably mounted by being received within apertures of a U-shaped metal supporting means 57 which is riveted to the rear wall of the insulated enclosure 51. This slide bar 139 is at one end provided with a lip 140 for engaging the contact lever 122 and pulling it toward open position and also a pair of ears which receive a pin 141 upon which is pivotally mounted a resetting link 142.

Figures 10, 11:
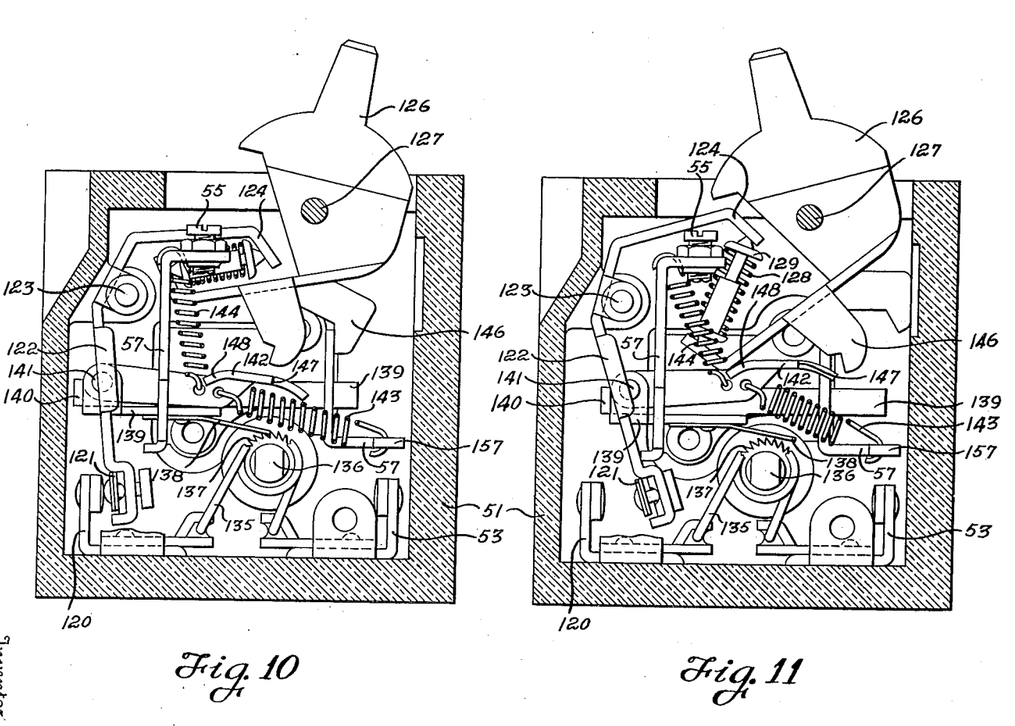
Fig. 10 is a vertical sectional view of the overload protecting and resetting apparatus with the apparatus in properly set condition.
Fig. 11 is a vertical sectional view of the overload control with the apparatus in the tripped condition.
Figures 12, 13:
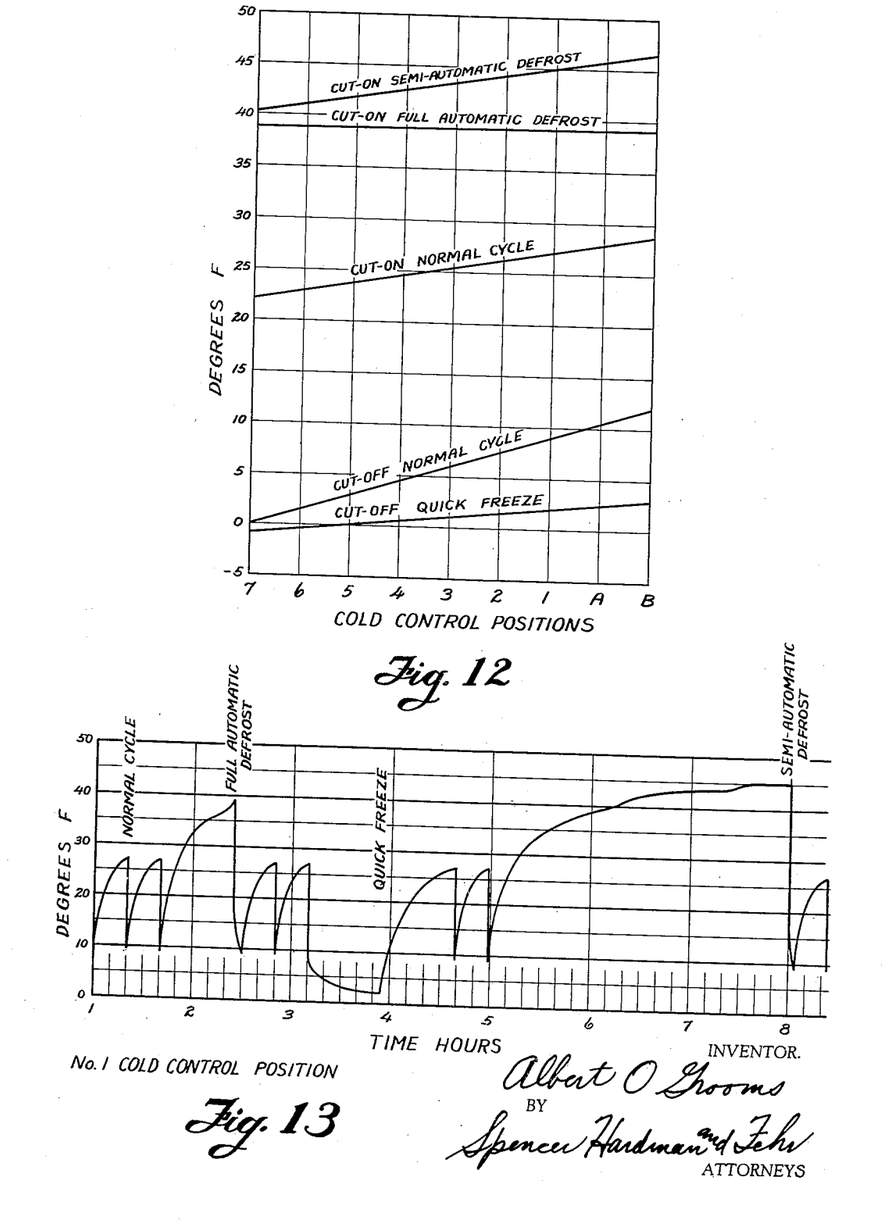
Fig. 12 is a graph with temperature plotted against cold control positions showing the cut-on and cut-off temperatures for the normal cycle, the semi-automatic and full automatic defrost and the quick freezing cycle in the various cold control positions.
Fig. 13 is an illustrative chart having temperature plotted against time showing typical normal full automatic, quick freeze and semi-automatic defrost cycles with the cold control in No. 1 position.

When in a properly set position illustrated in Fig. 10, the ratchet wheel 137 is held in a fixed position by the fusible binder upon the pin 136 and the leaf spring riveted to the slide bar then engages the upper teeth of the ratchet wheel 137, so that the slide bar 139 and the resetting link 142 are prevented from moving toward the right. However, when an overload current passes through the heater wire 135, the fusible binder becomes soft, thus permitting the ratchet wheel to turn upon the pin 136 thereby releasing the leaf spring 138 and permitting the slide bar 139 to move to the right under the influence of the tension spring 143 which is anchored to an ear 157 formed on the U-shaped bracket 57.

As the slide bar 139 moves to the right, another tension spring 144 which connects the resetting link 142 with the upper portion of the bracket 57 exerts more of an influence and moves the free end of the resetting link 142 outwardly so that it assumes the position shown in Fig. 11.

In order to reset this overload mechanism, an engaging arm 146 is provided on the finger manipulator 126 so that it may engage the shoulder 147 upon the free end of the resetting link 142. Further movement of the finger manipulator 126 in a clockwise direction moves the free end of the resetting link 142 to the left and during this movement, the curved portion 148 upon the resetting link engages the portion 56 (see Fig. 1) of the bell crank contact carrying lever, so that the temperature regulating contacts are held in their open position during the resetting of the thermal overload contacts. During this resetting operation, the toggle mechanism in the ordinary manner moves the overload contacts to closed circuit position, while the temperature regulating contacts are held in the open position. Thus, the refrigerating system is protected in this way during the resetting of the overload contacts.

When the overload contacts are moved to closed circuit position, and the resetting link and the slide bar are moved to the left, the leaf spring 138 again engages the upper teeth of the ratchet wheel 138 and prevents the movement to the right of the slide bar 139. During this movement of the resetting link to the left, the toggle spring 143 becomes stretched, so that the resetting link 142 is pulled downwardly as soon as pressure is released on the finger manipulator 126. This moves the resetting link out of engagement with the projecting portion 56 of the contact carrying bell crank lever to permit the temperature regulating contacts to close as well as out of the path of the engaging portion 146 of the finger manipulator 126.

When the overload mechanism is tripped, the overload contacts are pulled to open position, the toggle mechanism is pulled across dead center and the finger manipulator 126 is moved to open position, thereby giving an indication that the refrigerating system is shut off. By holding open the temperature regulating contacts during resetting and by disengaging the resetting link 142 after resetting the overload contacts, the system is protected at all times from overload and it is impossible to interfere with the proper operation of the temperature regulating contacts or to prevent the proper operation of the overload mechanism.

While the form of embodiment of the invention as herein disclosed, constitutes a preferred form, it is to be understood that other forms might be adopted, all coming within the scope of the claims which follow.

What is claimed is as follows:

1. Refrigerating apparatus including an evaporator and means for supplying liquid refrigerant to and for withdrawing evaporated refrigerant from the evaporator, control means for normally controlling said supply means to normally maintain said evaporator at freezing temperatures, said control means including a common means capable of assuming a plurality of positions having a portion for periodically affecting the control to provide temperatures above freezing when in one position and having another portion effective when the common means is set in another position to render the periodic portion of the common means ineffective and to affect the control to automaticaly provide a temperature of the evaporator above freezing and thereafter again rendering the periodic portion of the common means effective and automatically returning the apparatus to normal control.

2. Refrigerating apparatus including an evaporator and means for supplying liquid refrigerant to and for withdrawing evaporated refrigerant from the evaporator, control means for normally controlling said supply means to normally maintain said evaporator at freezing temperatures, said control means including means for periodically affecting the control to provide temperatures above freezing, compensating means for said periodic means, and selective means for preventing the periodic means from affecting the normal action of the control means in any way.

3. Refrigerating apparatus including an evaporator and means for supplying liquid refrigerant to and for withdrawing evaporated refrigerant from the evaporator, control means for starting and stopping the supply of liquid refrigerant according to predetermined temperatures of the evaporator, selective means for periodically changing one of the temperature limits for a single cycle and thereafter returning the apparatus to normal control, a second selective means for varying the average temperature of the evaporator, and means for compensating said first mentioned selective means according to the temperature variation provided by said second selective means.

4. Refrigerating apparatus including an evaporator and means for supplying liquid refrigerant to and for withdrawing evaporated refrigerant from the evaporator, control means for starting and stopping the supply of liquid refrigerant according to predetermined temperatures of the evaporator, selective means for periodically raising one of the temperature limits and thereafter returning the apparatus to normal control, selective means for lowering one of the temperature limits and thereafter returning the apparatus to normal control, and a separate selective means for varying the temperature limits to obtain a different average temperature, and means controlled by said last mentioned selective means for compensating said first two selective means for changes in said separate selective means.

5. Refrigerating apparatus including an evaporator and means for supplying liquid refrigerant to and for withdrawing evaporated refrigerant from the evaporator, control means for starting and stopping the supply of liquid refrigerant according to predetermined temperatures of the evaporator, selective means for periodically raising one of the temperature limits and thereafter returning the apparatus to normal control, a second selective means independent of said first mentioned selective means for lowering one of the temperature limits and thereafter returning the apparatus to normal control, said selective means being so arranged that any selected will overcome the other selective means regardless of their position.

6. Refrigerating apparatus including an evaporator and means for supplying liquid refrigerant to and for withdrawing evaporated refrigerant from the evaporator, control means for starting and stopping the supply of liquid refrigerant according to predetermined temperatures of the evaporator, said control means including overload means for preventing operation of the supply means and selective means for preventing operation of the supply means and for resetting the overload means and restoring the normal operation of the control and supply means, said selective means including means for preventing at all times the manual relocking of the overload means in reset position regardless of any manipulation of the selective means.

7. Refrigerating apparatus including an evaporator and means for circulating a refrigerant medium through the evaporator, control means for controlling the circulation of refrigerant through the evaporator to maintain a predetermined average temperature therein, said control means including a loading means and an escapement type mechanism for periodically causing the loading of the control means by the loading means for varying the average temperature of the evaporating means.

8. A control means for refrigerating systems or the like including a pressure operated means and a means operated thereby, an adjustable means for applying an adjustable load upon the pressure operated means, said adjustable means comprising a carriage and a loading spring means connecting the carriage and the pressure operated means, and a manually initiated single cycle loading device for loading the pressure operated means for a portion of a cycle, said single cycle loading device having a spring connected to the carriage for compensating the single cycle loading device for the effect of the change of position of the carriage upon the loading spring means.

9. A pressure responsive circuit controlling means for refrigerating systems or the like including means for opening and closing an electric circuit and pressure responsive means connected thereto for causing the circuit to be opened and closed at predetermined pressure limits, a ratchet wheel for periodically interposing a resistance to the movement of the pressure responsive means to cause the circuit to be opened and closed at other pressure limits, and escapement type actuating means for ratcheting said ratchet wheel according to reciprocations of the pressure responsive means.

10. Refrigerating apparatus including a cooling unit and means for circulating a refrigerant medium through the cooling unit, control means for normally controlling the circulation of refrigerant medium according to predetermined high and low temperatures affected by the circulation of the refrigerant medium, a periodic device indexed every cycle by the control means solely at other temperatures than the said predetermined high and low temperatures, said periodic device including means periodically effective for disturbing the normal operation of the control means to disturb one of said temperature limits.

11. Refrigerating apparatus including a cooling unit and means for circulating a refrigerant medium through the cooling unit, control means for normally starting and stopping the circulation of refrigerant medium according to predetermined high and low temperatures affected by the circulation of the refrigerant medium, a periodic device indexed every cycle by the control means solely at other times than the starting and stopping of the circulation of refrigerant medium to avoid disturbing the starting and stopping points, said periodic device including means periodically effective for disturbing the normal operation of the control means to disturb one of said temperature limits.

12. Refrigerating apparatus including a cooling unit and means for circulating a refrigerant medium through the cooling unit, a movable control means movable to one position to start the circulation of the refrigerant medium according to a predetermined high temperature condition, said movable control means being movable to a second position to stop the circulation of refrigerant medium according to a predetermined low temperature condition, a periodic device indexed every cycle by a portion of the movement of the control means which does not include said starting and stopping positions to avoid disturbing the relationship between the predetermined temperatures and the starting and stopping of the circulation, said periodic device including means periodically effective for disturbing the normal operation of the control means to disturb one of said temperature limits.

13. In a control for refrigerating systems or the like, a circuit opening means and a pressure responsive means for operating said circuit opening means to open and close an electric circuit, and a mechanism operated by the pressure responsive means for periodically disturbing the normal operation of the pressure responsive means, said mechanism including a ratchet wheel for disturbing the normal operation of the pressure responsive means, and a rocking member having a plurality of teeth for ratcheting said ratchet wheel, one of said teeth being effective to ratchet the wheel when the rocking member is rocked in a clockwise direction and another being effective to ratchet the wheel when the rocking member is rocked in a counterclockwise direction.

14. A control means for refrigerating systems or the like including pressure operated means and a means operated thereby, an adjustable means for applying an adjustable load upon the pressure operated means, said adjustable means comprising a carriage for a loading spring means connecting the carriage and the pressure operated means, and a single cycle snap acting loading device for applying a load to the pressure operated means for a portion of a cycle only, said single cycle loading device having a spring connected to the carriage for compensating the single cycle loading device for the effect of the change of position of the carriage upon the loading spring means.

ALBERT O. GROOMS.